United States Patent [19]

Heidman, Jr.

[11] Patent Number: 4,791,401

[45] Date of Patent: Dec. 13, 1988

[54] HIGH LEVEL REAR BRAKE LAMP AND ALTERNATING DIRECTIONAL LAMPS

[76] Inventor: William A. Heidman, Jr., 4604 Robbins, San Diego, Calif. 92122

[21] Appl. No.: 3,863

[22] Filed: Jan. 16, 1987

Related U.S. Application Data

[63] Continuation-in-part of Ser. No. 387,457, Jun. 11, 1982, Pat. No. 4,638,296.

[51] Int. Cl.$^4$ .............................................. B60Q 1/26
[52] U.S. Cl. .......................................... 340/71; 340/66
[58] Field of Search ............... 340/66, 71, 67, 69, 340/93, 94, 72–74, 76, 81 R; 307/10 LS

[56] References Cited

U.S. PATENT DOCUMENTS

| | | | |
|---|---|---|---|
| 3,395,388 | 7/1968 | Hendrickson | 340/66 |
| 3,501,742 | 3/1970 | Ellison | 340/71 |
| 4,087,784 | 5/1978 | West | 340/66 |
| 4,354,174 | 10/1982 | Heidman, Jr. | 340/63 |
| 4,470,036 | 9/1984 | Doerr et al. | 340/66 |
| 4,556,862 | 12/1985 | Meinershagen | 340/67 |
| 4,575,706 | 3/1986 | Heidman, Jr. | 340/63 |
| 4,651/129 | 3/1987 | Wood et al. | 340/71 |
| 4,667,177 | 5/1987 | Athalye | 340/66 |

Primary Examiner—Donnie L. Crosland
Assistant Examiner—Brent A. Swarthout
Attorney, Agent, or Firm—Frank D. Gilliam

[57] ABSTRACT

A light module for connection to an automobile linking circuit for placement at an elevated level at the rear of the vehicle. The light module includes a pair of low candle power illuminating lamps on each side of a centrally positioned higher candle power illumination lamp. The pairs of lamps intermittently illuminate together when the vehicle headlights are off indicating a turn direction. When the head lights are illuminated the lamps of each pair of lamps alternately illuminate indicating turn direction. When the automobile brakes are applied all five lamps of the module illuminate. When the hazard light system of the automobile is activated, the illumination of all five lamps of the module alternate on and off. When in addition to the hazard circuit activation the head lamps are turned on the illumination of the outer most lamps on each end of the module alternate with the center lamp.

5 Claims, 2 Drawing Sheets

HIGH LEVEL REAR BRAKE LAMP AND ALTERNATING DIRECTIONAL LAMPS

BACKGROUND OF THE INVENTION

This application is a continuation in part of my pending application having Ser. No. 387,457 filed June 11, 1982, now U.S. Pat. No. 4,638,296.

This invention is directed to improvements in vehicle directional signaling devices and more particularly to an elevated signaling device located on the rear of a vehicle in plain view of the operator of a vehicle following.

Elevated rearward directed signaling devices for vehicles for signaling a vehicle following that the forward vehicle has applied its brakes to de-accelerate and/or stop has become a requirement for all vehicles currently sold new and operated in the United States of America. There is however no such requirement for turn signal indications with respect to elevation thereof.

In my prior U.S. Pat. Nos. 2,766,343; 3,263,211; 3,372,373; 3,372,374; 4,354,174; and 4,575,706, I have disclosed alarm circuits which activated flashing hazard light and horn circuits which may be readily adaptable to be incorporated with my present invention for enhancement therof.

Also of general interest in the automobile circuit wiring art directed to turn signaling and hazard flashing indicators are U.S. Pat. Nos. 2,238,394; 2,783,452; 3,601,795; 3,720,917 and British Pat. No. 1,210,061.

There has not been available a vehicle light module for elevated rear placement thereon which includes a wiring circuit which complies with the law directed to elevated stop lights and in addition provides a new and unique light illumination sequence for turning signaling and hazard warning or a further development of the parent patent.

SUMMARY OF THE INVENTION

The invention is directed to a unique light module which includes a pair of low candle power 12 volt lamps positioned on each side of a centrally positioned lamp with higher candle power. The module top surface slants downward toward the bottom surface. The bottom surface and front surface are substantially at right angles. The five lamps may be wired or connected to the existing vehicle wiring circuit or may be similarly factory wired for inclusion on new vehicles. Walls extend between the lamps for light shielding therebetween. The unique wiring circuit enables the five lamps to perform various different lighting sequences for similar functions when the head lights of the vehicle are on or off.

The general intent is to provide a more distinguishable visual presentation to the rear of the vehicle when the vehicle head lights are on, generally during darkness hours, than when the vehicle head lights are off generally during day light hours. With the headlights off the circuit and lamp functions are as follows: With the head lights off and the left turn signal indication is initiated the pair of low candle power lamps on the left side of the module as viewed from the rear of the vehicle flash on and off together, and the conventional turn signal lamp or lamps on the vehicle flash in a normal expected manner. When the vehicle brakes are applied during turn signaling, the three remaining lamps in the module illuminate and the first two lamps continue to flash on and off. When the brakes of the vehicles are applied while no turn signal is indicated, all five lamps illuminate together. Likewise under the same conditions, all five lamps flash when the hazard circuit is energized. The same events occur during right turn indications, as discussed above during a left turn. Obviously, the right side pair of lamps flash on and off and when brakes are applied during a right turn the remaining three lamps illuminate.

With the vehicle head lights on and no turn indication, and neither the brake or hazard circuits are energized only the two outer end positioned lamps of the module illuminate. When brakes are applied with head lamps on these two outer lamps extinguish and the center lamp and the lamps on each side of center lamp illuminates. With the head lamps on and a turning direction initiated, the two adjacent outside lights on the turn indicator side of the vehicle will alternately flash as the most outer position lamp on the opposite sides remains steadily illuminated. When the head lamps are on and a turn indication has been initiated and brakes are then applied, the two outer end positioned lamps will continue to alternately flash, one on and one off, the center lamp and the lamp positioned adjacent to this center lamp on the opposite side will steadily illuminate and the outer most lamp on the opposite side will extinguish. With the head lights on and the hazard circuit energized, the outer most positioned lamps alternate in unison with the center lamp and the lamps on each side of the center lamp.

The purpose of the light module is to alert the driver of a vehicle following a vehicle with the light module installed to the vehicle operation intent of the driver of that vehicle. Greater visual attention is provided during darkness hours than daylight hours.

An object of this invention is to provide a unique signaling device and circuit which draws greater attention at night from the driver of a vehicle following the vehicle on which the device is installed and yet draws sufficient attention during day light hours.

Another object of this invention is to provide a novel signaling device which meets and exceeds the requirements for elevated stop signaling device for vehicles.

Still another object of this invention is to provide a unique signaling device and wiring circuit that can be retro-fitted to existing vehicles as well as installed in newly manufactured vehicles.

These and other objects of the invention will become apparent from the following description taken together with the accompanying drawings.

BRIEF DESCRIPTIONS OF THE DRAWINGS

DETAILED DESCRIPTION OF THE PREFERRED EMBODIMENTS

Figure 1:
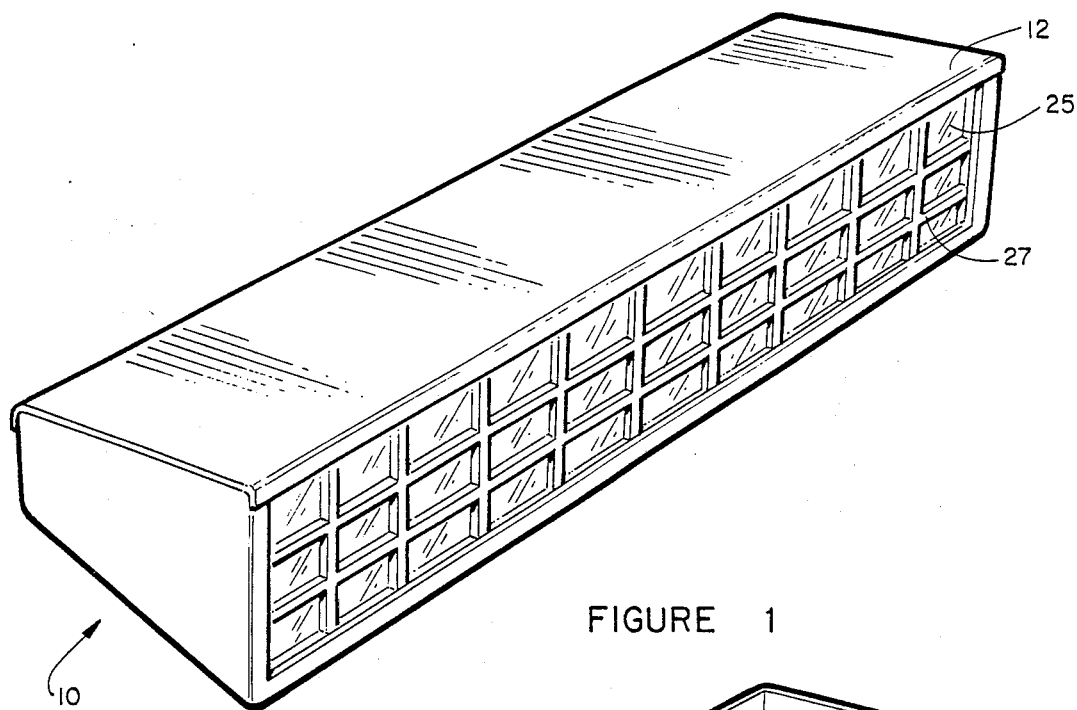
FIG. 1 is an elevated perspective showing of the light module of the invention.
Figure 2:
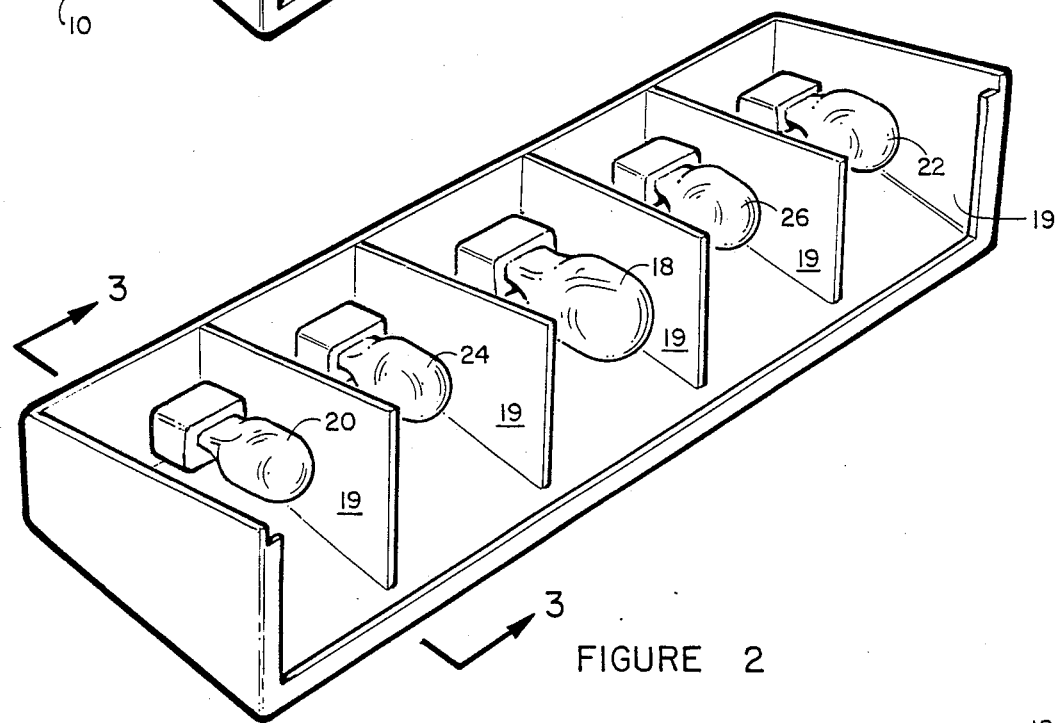
FIG. 2 is an elevated perspective showing of the front of light module with the top surface, lens and grid removed.
Figure 3:
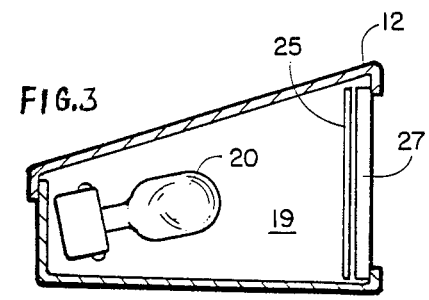
FIG. 3 is an end view showing of FIG. 1 taken along line 3—3 of FIG. 1 showing the angled sockets, bulb, top, and lens and grid positions.

Referring now to FIGS. 1-4, the light module 10 of the invention includes an exterior housing 12. The bottom of the housing is substantially at right angles with the bottom surface and the top surface slants downwardly toward the bottom surface in a rearward direction. Within the housing 12 is a centrally located lamp 18 which is primarily employed as an indication of automotive brake application (stop lamp). This lamp 18 has a wattage range of from 15 to 27 watts. Adjacent to lamp 18 on each side thereof are positioned directional lamps 20 and 24 and 22 and 26. The lamps 20, 22, 24, and 26 are about two candle power. A divider wall 19 is positioned between lamps 20 and 24, 24 and 18, 18 and 26, and 26 and 22 to prevent illumination between the lamps. The lamps are interconnected to the vehicle wiring as hereinafter discussed. A translucent red lens 27 and grid diffuser 25 covers the housing opening and is removable for lamp changing, etc.

Figure 4:
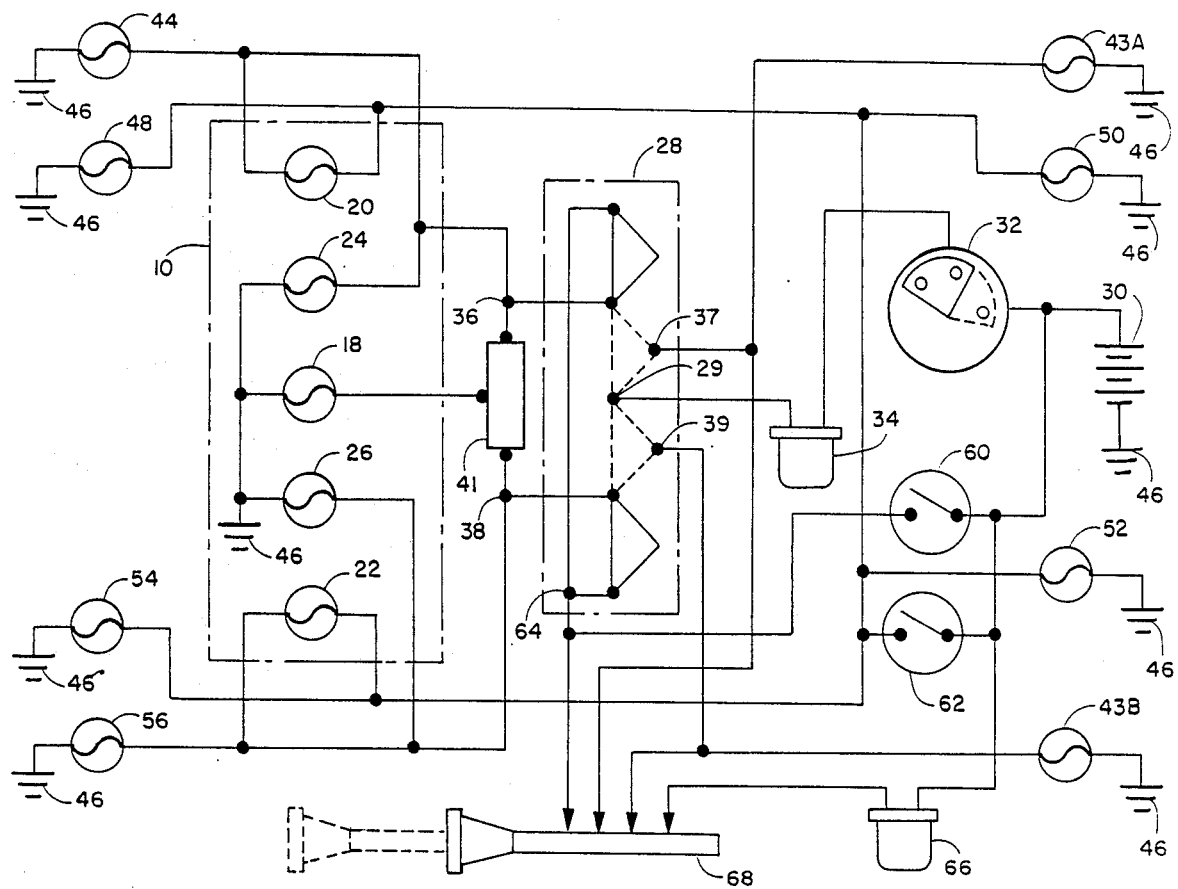
FIG. 4 is a schematic showing of one embodiment employing the light module of FIG. 1.

Referring now to FIG. 4, a conventional vehicle electrical lighting circuit for turn signal, stopping, hazard indication, head lights and tail lamps is shown.

A steering column mounted turn signal switch 28 receives its input voltage at terminal 29 from battery 30, through the ignition switch 32, when in its "on" position, and a flasher element 34. When the turn signaling switch is positioned to indicate a proposed left turn periodic battery voltage is applied to output terminals 36 and 37, and when positioned to indicate a proposed right turn battery voltage is applied to output terminals 38 and 39.

Figure 5:
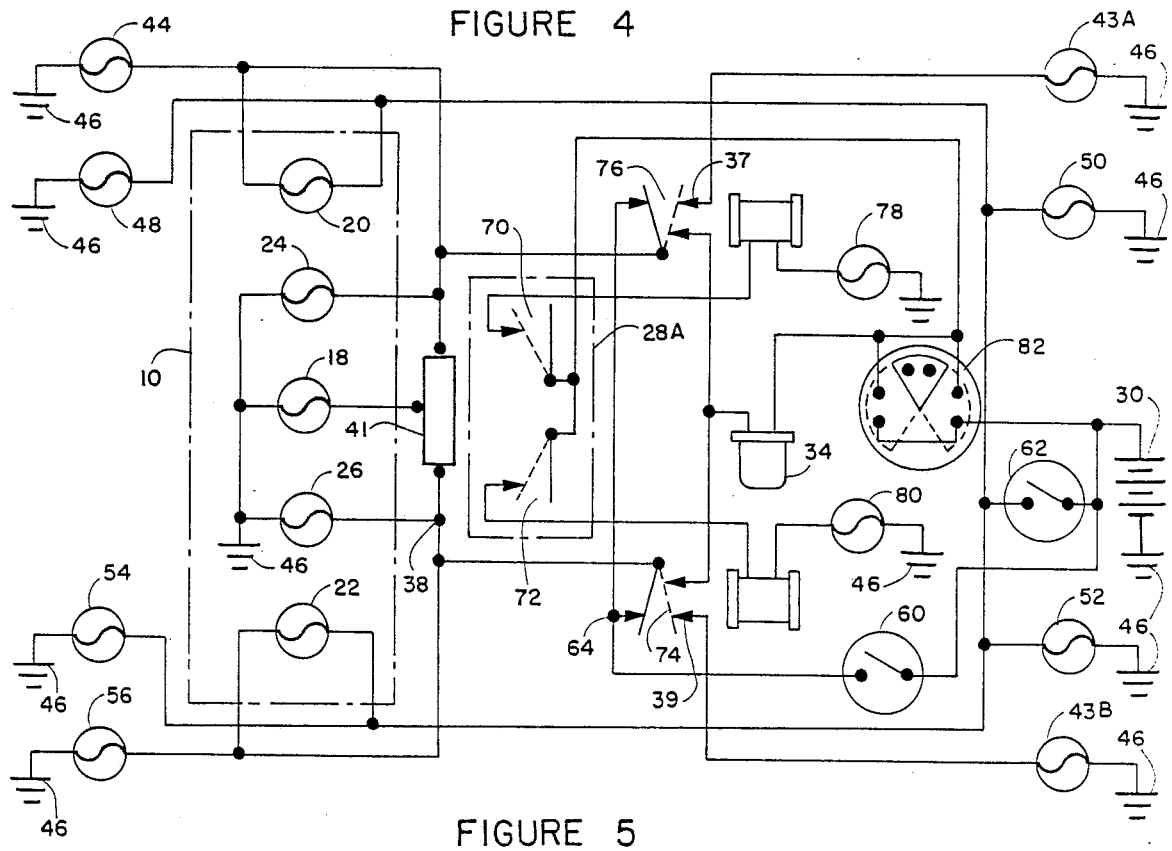
FIG. 5 is a schematic showing of a second embodiment employing the light module of FIG. 1.

The current path from output terminal 36 is through an isolation means 41 which isolates the vehicle left and right hand lighting circuits which are common to stop lamp 18. The isolation means 41 can either be an "or" gate or a device of like function. The connections of the isolation means 41 are shown in FIGS. 5 and 6. Output terminal 36 is also connected to the element of the vehicle stop lamp 44 and the element of directional lamps 20 and 24. The opposite end of the element of the stop lamp 44 is connected to battery ground terminal 46 and the opposite end of the element of the directional lamp 20 is connected to the element of the vehicle tail lamp 48, the elements of the vehicle head lamps 50 and 52, the elements of tail lamp 54 and directional lamps 22 and 26. The other side of the elements of tail lamp 48, head lamps 50 and 52 and tail lamp 54 are connected to battery ground 46. The other end of the element of lamp 22 is connected to one end of the element of stop lamp 56 and directional lamp 26 and output terminal 38 of the turn signal switch 28 and isolation means 41. The other end of the element of directional lamp 26 is connected to battery ground 46. The output terminal 37 is connected to the element of front directional lamp 43A. The other end of which is connected to battery ground 46.

It should be understood that when the turn indicator switch 28 is operated for a right turn, periodic battery voltage from output terminal 38 provides current flow through the right turn lamps in the same manner as described for output terminal 36 of the left turn lamp circuit, and battery voltage at terminal 39 illuminates lamps 26, 43B, and 56.

A stop lamp switch 60 when closed provides a steady state battery voltage to terminal 64 of the turn signal switch which is electrically common with output terminals 36 and 38. Steady state battery voltage at output terminals 36 and 38 provide current flow to illuminate lamps 18, 20, 22, 24, 26, 44, 48, 54 and 56 in a steady state.

A head lamp switch 62 when closed provides steady state voltage to the head lamps 50 and 52, tail lamps 48 and 54 and to the element of lamps 22 and 20. The other end of the elements of lamps 20 and 22 respectfully are connected to the elements of stop lamps 44 and 56, to lamps 24 and 26 and to isolation means 41. The isolation means 41 is connected to the element of stop lamp 18 as shown in the Figures to pass current in only one direction, i.e. only from terminals 36 and 38 to lamp 18. The isolation module 41 inhibits current flow between terminals 36 and 38.

A second flasher element 66 is connected between the positive terminal of battery 30 and hazard switch 68. The solid showing of the hazard switch in the drawing is the "on" position and the phantom showing is the "off" position. In the "on" position periodic current from the battery flows through all the lamps.

When the head light switch 62 is closed to provide head and tail light illumination lamps 20 and 22 steadily illuminate. When the turn signal switch 28 is switched for a left turn indication and the head light switch 62 is closed, the following light sequence occurs: Head lamps 50, 52 and tail lamps 48, 54 and lamp 22 remains illuminated and lamps 20 and 24 alternate. When the brake light switch 62 is closed, lamps 20 and 24 alternate, 18 and 26 steadily illuminates and lamp 22 is extinguished. When the headlights are illuminated and the hazard switch 68 is closed (shown in FIG. 1) lamps 20 and 22 alternately flash with combined lamps 24, 18 and 26.

Referring now specifically to FIG. 5, the circuit of FIG. 5 is substantially the same electrically as FIG. 4 and the lamps function and illuminate in the same manner under various operating conditions as described under the description of FIG. 4. The turn signal switch 28 and hazard switch 68 of FIG. 4 are replaced in the FIG. 5 showing by a pair of rocker mounted switches 70 and 72 generally mounted on the steering wheel upper surface. These switches 70 and 72 rock or rotate about a central pivot. In one direction of rotation the switches are biased to return to a normally "off" or switch open position. These rocker switches provide a most convenient operation for a lane changing feature. When rotated in the opposite direction the switch is locked in the "on" or closed position. A second rotational force in the same direction of the locking action will release the lock returning the switch to the normal "off" or open position. The closing of the switches 70 and 72 activate relay switches 74 and 76 respectfully. Lamps 78 and 80 are located in the ground line from the coils of the relay switches. These lamps 78 and 80 perform two functions, namely, indicate the closure of switches 70 and 72, hence operation of relay switches 74 and 76 respectfully and limit the current through the coils reducing the heating thereof. It should be understood that the depressing of switches 70 and 72 for rotation in the non-locking direction provides vehicle turn indication and when both are pressed for rotation in the lock direction vehicle hazard functions are performed. The closure of both switches 70 and 72 simultaneously cause the rear turn signal lamps to alternately flash with the brake lamps for a hazard signal mode.

The turn signal switch 28A in FIG. 5 is designed to combine the turn signal lamps with brake lamps. (See explanation of functioning in my U.S. Pat. No.

4,354,174.) Therefore, in order that a single filament in the bulb is to provide both functions, it is necessary to by pass the brake circuit on the turn signal side, otherwise, the brake lamp would cancel out the turn signal flashing. Designing rocker switches to meet this requirement proved impractical in experimentation. The circuit and relays shown proved quite effective, not only in meeting this requirement but also the simplicity in manufacturing from both the standpoint of cost, as well as repair. In conjunction with this, the hazard system (shown in FIG. 5) employs only one flasher compared to the conventional two flashers as shown in FIG. 4.

The ignition switch 82 is designed to operate the hazard only in the "on" or "accessory" positions, hence, preventing children from operating simply by removing the keys from the ignition switch. The key is removable from the ignition switch only in the "off" and "accessory on" positions.

The various lamps of the circuit of FIG. 5 illuminate in the same manner as the lamps of FIG. 4 when the same conditions are present.

What has been described is a novel lighting and signaling system for an automotive vehicle which improves the visibility of vehicle conditions and hence improves the safety conditions of persons within the vehicle.

It will be apparent to those skilled in the art that many modifications and variations may be effected without departing from the spirit and scope of the novel concepts of the present invention.

What is claimed is:

1. An elevated level rear brake lamp and directional lamps for an automotive vehicle, said automotive vehicle having conventional turn and brake indicator lamps on each side of said vehicle positioned below said elevated rear brake lamp and directional lamps, a source of voltage, a turn indicating switch for indicating right and left vehicle turns, a flasher element connected between said source of voltage and said turn signal switch, head lamps and turn signal lamps on each side of the front of said vehicle, combination stop and turn indicator lamps and tail lamps on each side of the rear of said vehicle, a head lamp activation switch positioned between said source of voltage and the head and tail lamps on each side of the rear of said vehicle and a hazard switch connected to said combined stop and turn indicator lamps, the invention comprising:

a boxed shaped housing with an open side and an upper surface slanting downwardly and rearwardly toward a bottom surface;

five lamps positioned within said housing;

four divider walls within said housing for isolating the illumination from each of said plurality of lamps from each other within said housing;

said five lamps comprise first and second lamps, third and fourth lamps, said first and second lamps and said third and fourth lamps being positioned on opposite ends of said housing separated by a fifth centrally positioned lamp, said first, second, third and fourth lamps are of an equal level of illumination with the fifth lamp having a substantially greater level of illumination than said first, second, third and fourth lamps;

said first lamp being connected in parallel with said combined stop and turn indicator lamp on the left side of the vehicle;

said fourth lamp being connected in parallel with said combined stop and turn indicator lamp on the right side of the vehicle;

said second lamp being connected in series between said tail lamp and said combined stop and turn indicator lamp on the right side of the vehicle;

said third lamp being connected in series between said tail lamp and said combined stop and turn indicator lamp on the left side of the vehicle; and an isolation means connected between said turn indicating switch and said fifth lamp for isolation of said source of voltage between the lighting circuits of the left and right side of the vehicle;

whereby when the taillights of the vehicle are on said second and third lights are activated; when the taillights are on and the brakes are applied said first, fourth and fifth lights are activated and said second and third lights are deactivated; and when the taillights are on, the brakes are applied and the turn signal is activated, the two outer lamps on the side of the housing to which a turn is being made alternately flash on and off with respect to one another, the center lamp and the lamp positioned adjacent thereto on the opposite side of the housing are steadily illuminated, and the outermost lamp on the opposite side of the housing is deactivated.

2. The invention as defined in claim 1 wherein said first, second, third, and fourth lamps are approximately two candle power and said fifth lamp is in the range of from 15 to 27 watts.

3. The invention as defined in claim 1 wherein said isolation means is an "or" gate.

4. The invention as defined in claim 1 wherein said isolation means is a pair of diodes.

5. The invention as defined in claim 1 wherein said turn indicating switch comprises:

a pair of rocker switches interconnected between a source of voltage and said elevated brake and directional lamp and said conventional brake and turn indicator lamps, said rocker switches being in a normally open non-conductive state and having first and second separate closed conductive states, in the first closed conductive state said rocker switches return to their normally open non-conductive state when released and when in the second closed conductive state said rocker switches remain locked in their closed conductive state until the switches are manually removed from the locked position, said rocker switches control the front and rear turn signal lamps and rear brake lamps on separate sides of said vehicle;

a brake lamp switch; and a pair of relay means, one associated with one of said pair of rocker switches for disconnecting said brake lamps from said brake lamp switch on the side of said vehicle corresponding to the closed state of its associated rocker switch.

* * * * *